United States Patent
Cherniavsky et al.

(10) Patent No.: US 6,662,191 B1
(45) Date of Patent: Dec. 9, 2003

(54) METHOD AND APPARATUS FOR CACHING AND REUSING OBJECT IDENTIFIERS

(75) Inventors: John P. Cherniavsky, Los Altos, CA (US); Michael A. Gustafson, Los Altos, CA (US); Rao S. Kota, Santa Clara, CA (US)

(73) Assignee: Amdocs Software Systems Limited, Dublin (IE)

( * ) Notice: Subject to any disclaimer, the term of this patent is extended or adjusted under 35 U.S.C. 154(b) by 367 days.

(21) Appl. No.: 09/745,903

(22) Filed: Dec. 21, 2000

(51) Int. Cl.$^7$ ............................................... G06F 17/00
(52) U.S. Cl. .................. 707/103 X; 707/200; 707/201; 707/102; 709/313
(58) Field of Search ............. 707/1–206; 709/310–320; 717/100–119

(56) References Cited

U.S. PATENT DOCUMENTS

| | | | |
|---|---|---|---|
| 5,684,984 A | | 11/1997 | Jones et al. |
| 5,724,575 A | | 3/1998 | Hoover et al. ................ 707/10 |
| 5,826,268 A | | 10/1998 | Schaefer et al. |
| 6,550,057 B1 | * | 4/2003 | Bowman-Amuah ............ 707/5 |
| 6,567,846 B1 | * | 5/2003 | Garg et al. ..................... 707/3 |
| 6,571,282 B1 | * | 5/2003 | Bowman-Amuah .......... 707/10 |

FOREIGN PATENT DOCUMENTS

| | | |
|---|---|---|
| EP | 0365115 A2 | 4/1990 |
| EP | 1178643 A1 | 2/2002 |
| WO | WO 95/32463 | 11/1995 |

OTHER PUBLICATIONS

Black, Object identity, Object Orientation in Operating Systems, 1993, Proceedings of the Third International Workshop on, Dec. 9–10, 1993, pp. 175–176.*

Davidson et al., Digital object identifiers and their role in the implementation of electronic publishing, Socioeconomic Dimensions of Electronic Publishing Workshop, 1998, Proceedings, Apr. 23–25, 1998, pp. 59–65.*

Zatti, Naming in OSI: distinguished names or object identifiers!, CompEuro '91, Advanced Computer Technology, Reliable Systems and Applications, 5th Annual European Computer Conference, Proceedings, May 13–16, 1991, pp. 258–262.*

Tuijnman, Frank et al., "Distributed Objects in a Federation of Autonomous Cooperating Agents," IEEE 1993, pp. 256–265.

* cited by examiner

*Primary Examiner*—David Jung
(74) *Attorney, Agent, or Firm*—Haynes and Boone, LLP

(57) ABSTRACT

A method and system is provided for distributing and reusing object identifiers in a distributed database system. A first table of object identifiers created by the database is maintained for supplying unallocated object identifiers for each type. A second table of object identifiers is also maintained containing reusable and distributable object identifiers to one or more application server in the database system. The application server obtains a predetermined number of object identifiers from the first and second tables to be stored in each of the application servers for servicing client applications related to the application server.

13 Claims, 2 Drawing Sheets

METHOD AND APPARATUS FOR CACHING AND REUSING OBJECT IDENTIFIERS

TECHNICAL FIELD

The present invention relates generally to database management, and more particularly, to an object identifier distribution method and system in a distributed database system.

BACKGROUND

Computer databases are essential elements of many computer networks. Large amounts of information can be continuously stored and updated in the databases during the operation of the network. In database management, activities performed on the database have been identified by an object identifier, or "objid".

In a distributed database system, the database may serve a multitude of disassociated application servers. With distributed databases, however, there are a limited number of objids available. Although in rudimentary databases this limitation is of no concern, but in larger, complex databases, such as those deployed in commercial transactions with numerous database management activities referenced by objids, this limitation could hinder the operation of the database by running out of objids. What is needed, therefore, is an efficient method to distribute and reuse the objids in a database system.

SUMMARY

A method and system is provided for distributing and reusing object identifiers in a distributed database system. In one embodiment, the object identifiers are correlated to data types. A first list of object identifiers created by the database is maintained for supplying unallocated object identifiers for each type. A second list of object identifiers is also maintained containing reusable and distributable object identifiers to one or more application servers in the database system. The application server obtains a predetermined number of object identifiers from the first and second lists to be stored in each of the application servers for servicing client applications related to the application server. The second list of object identifiers is a preferred source to obtain the object identifiers over the first list in order to take advantage of existing and reusable identifiers. Unused identifiers are returned from the application servers to the second list after their operations are terminated.

Since the second list of object identifiers contains reusable object identifiers, the application servers searches for needed object identifiers from the second list if possible. If it is not possible to get the needed identifiers from the second list, the first list is used to generate new object identifiers to meet the need. Every time the application server requests the object identifiers from the first list, a predetermined number of additional object identifiers are obtained to be stored in the application server for its future use.

DETAILED DESCRIPTION

Figure 1:
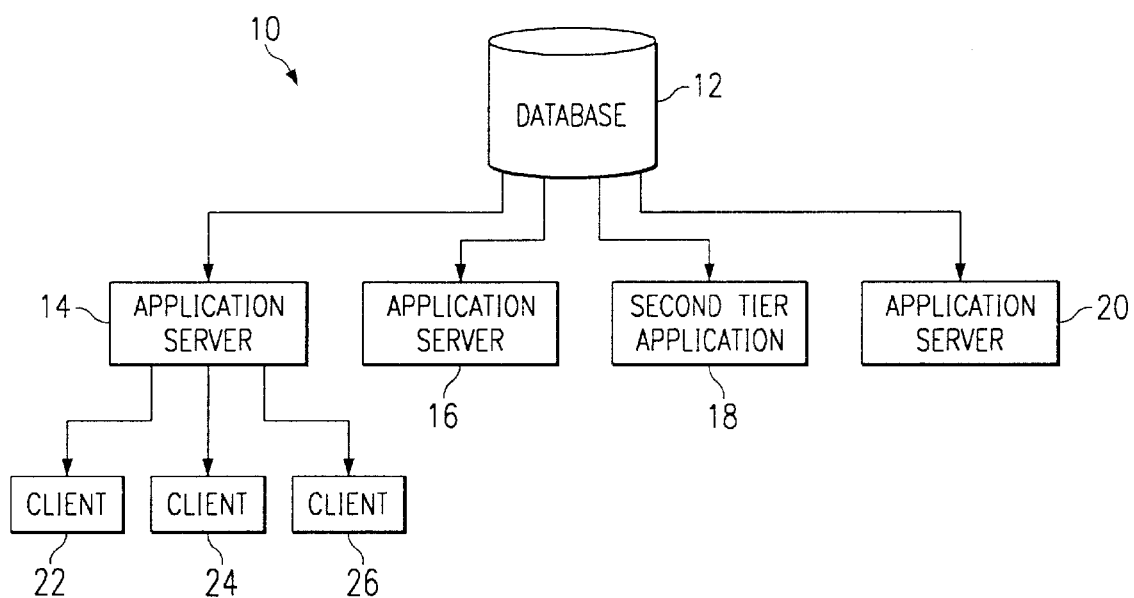
FIG. 1 illustrates an overview of an exemplary distributed database system.

Referring now to FIG. 1, a simplified database model 10 is shown. Although a database 12 is shown as one entity, it is understood that in a distributed database system, the database 12 does not have to reside in one location. The database 12 serves a plurality of application servers (14–16 and 20) or second tier applications (e.g.,18). Each application server has a multitude of client applications or third tier clients (or simply, clients) 22–26. The second tier application 18 is at the same level as the application servers because it does not serve any clients other than itself. Activities at the second- or third-tier client level require objids so that the entire database system will work coherently. All the objids are originally produced and provided from the database 12, and the application servers and the second tier client 14–20 can be viewed and used as objid distribution centers. The objids are of various types. That is, an "object" can be associated with almost any database activity, such as database entities, items, instances, attributes, procedures, etc. As an example, a part of the database 12 can be viewed as a table comprising columns and rows of data items needed for a computer application. For example, data items in a row correspond to a record, and each record is assigned an objid. The objids are unique within different types due to the classification of the data items they are "tagging." In general, an objid represents certain resources available in the database.

Computer applications running on the application servers may need to use the distributed database, and therefore need objids to identify resources in the database. In view of the large number of objids required for serving the needs of the distributed database system, these numbers should be unique to each other so that a redundant use of database resources will not occur. In general, once an objid is assigned to an object it cannot be reused by the database. Thus, when a request is made for a new object, the database typically assigns the next sequential number for that data type as the next objid.

Centralized objid sources had been utilized to generate and supply objid for the database. But a centralized objid source created a bottleneck due to the numerous activities to be managed in the network accessing the database. Simply put, such centeralized objid system lacked scalability.

In opposite to centralization, dispersing the objids across the network to the accessing application servers created another set of problems. That is, distributing large blocks of records to the application servers required that the component distributing the blocks still have a predetermined quantity of objids. As a result, objids are not used in an efficient manner and the supply of objids can still be quickly exhausted.

Presently, it is contemplated that an objid is a number between 0- and 4,294,967,295 ($2^{32}-1$). In normal circumstances, objids are 32-bit binary numbers in the computer programs.

According to a first example, two database tables are maintained in the database 12. The first table contains the most recent objid generated for each type (New Objid Table). Table 1 below illustrates a simplified "New Objid" Table.

TABLE 1

| Objid Type | Objid Number |
|---|---|
| 0 | 10 |
| 1 | 40 |
| 2 | 30 |
| 3 | 50 |
| 4 | 11 |
| 5 | 10 |

As shown in Table 1, there are five different types of objids, and the "Objid Number" column contains the most recently generated objid for each type. Since this New Object Table generates new objids (i.e., previously unallocated objids) in a sequential manner, the objid number therein is the "high watermark" of all the objids generated in the past. For instance, for type 0, the objid 10 has been previously provided. If a new objid is needed, it would be objid 11. Every time the database 12 generates new objids upon the request of the application server or the second tier clients, this New Objid Table will be updated to reflect the status of the objids of each type.

The second table in the database 12 contains discrete blocks of available objids ready to be distributed to the application servers (Reusable Objid Table). Table 2 below is a simple example of such a table.

TABLE 2

| Objid Type | Min Objid | Num of Objid |
|---|---|---|
| 1 | 5 | 3 |
| 1 | 9 | 4 |
| 3 | 25 | 10 |
| 4 | 10 | 2 |
| 4 | 23 | 4 |
| . | . | . |
| 4 | 50 | 5 |

In the present example, the Reusable Objid Table is the primary source for providing the objids to the application servers. The objids of each type in this table may be in discrete blocks because they are unused objids returned from the application servers. The Reusable Objid Table is appended or updated whenever the application servers check back in objids. For instance, in Table 2, the objids of type 1 have two rows or two discrete blocks, the first one starting from an objid of 5, and containing three objids. According to the present example, in the first block of objids of type 1, the available objids are 6, 7, and 8. Similarly, the second block of objids of type 1 contains the objids of 10, 11, 12, and 13.

Having extraneous rows of a single type (if for instance there were 5000 separate rows for type 1 objids instead of 2 rows as shown in Table 2) is considered a "problem," because it can slow down queries to the table and therefore defeat the purpose of reusing objids in a timely fashion. The number of extraneous rows considered to be a problem will depend on the size and specific parameters of a particular database. Similarly, the threshold number of the objids considered to be a mark of a problem can be determined by database programmers depending on the configuration of the database system. In this case, as it will be explained below, it is preferred to distribute these problem objids out from the Reusable Objid Table before the database generates any new ones.

It is noted that there are only three types of objids currently available in the Reusable Objid Table. These discrete blocks of objids are "leftovers" from the application server after has been shut down legally. Before the application server is terminated in its normal operation, through the connection it has with the database, it returns these unused or unassigned objids to the database. Once returned, they can then be used by any application server in the system that is still in operation. It is also possible that, upon starting up the next time, the application server that has returned certain objids may attempt to retrieve those returned objids first. These two tables are basically an indication of what objids have been generated or readily available in the database. For illustration purposes, it is assumed that when an application server "accesses" these two tables, it can get needed or requested objids.

In some embodiments, the application server may "cache" or temporarily store a predetermined number of objids for servicing its own clients without going to the database (or more precisely, the two tables) every time a request of objids from its client is initiated. The application servers may cache or store a relatively small number of objids to prevent the database from exhausting its available objids. The storage medium for the objids may be any suitable temporary storage medium, such as the server cache memory, RAM memory, or in some cases, disk memory.

In one example of the present invention, when a client 22 requests a set of objids from its related application server 14, the application server 14 uses existing objids saved in its cache memory to fulfill the request. If the cache memory is empty, the application server 14 may access the database to obtain more objids.

Whenever the application server 14 goes to the database 12 for obtaining objids, it is preferred that a set of objids larger than the size requested by the client 22 are delivered to the application server 14. Therefore, the application server 14 can continue servicing the clients without making round way trips to the database for each request made by any client (i.e., clients 22, 24 or 26).

An adjusting mechanism can be provided so that the application server obtains additional number of objids while requesting the same from the database. For example, for each type of objids within a server the next request made to the database can be about 50 percent more than the sum of what has been used up. If the application server is terminated in its normal operation, i.e., there is no abnormality such as power disruption or network crash in terminating the application server, then the application server returns to the database the unused or unassigned objids.

Figure 2:
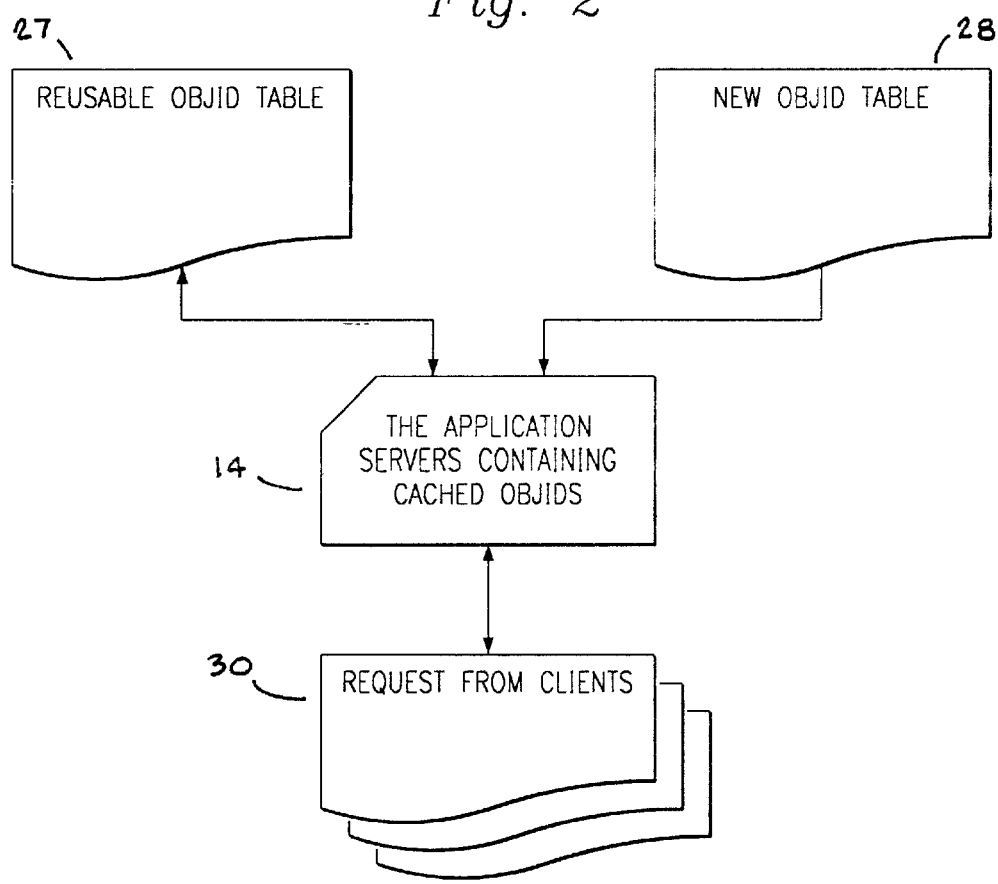
FIG. 2 illustrates an overview of the relationship among an application server, its client, and two database tables in the database according to one example of the present invention.

FIG. 2 graphically illustrates the relation among client requests 30, an exemplary application server, reusable objid table 27, and new objid table 28. For illustration purposes, the application server 14 of FIG. 1 will be used as the exemplary application server. For this example, the reusable objid table 27 may be populated as illustrated in table 2. Similarly, the new objid table 28 may be populated as illustrated in Table 1.

Figure 3:
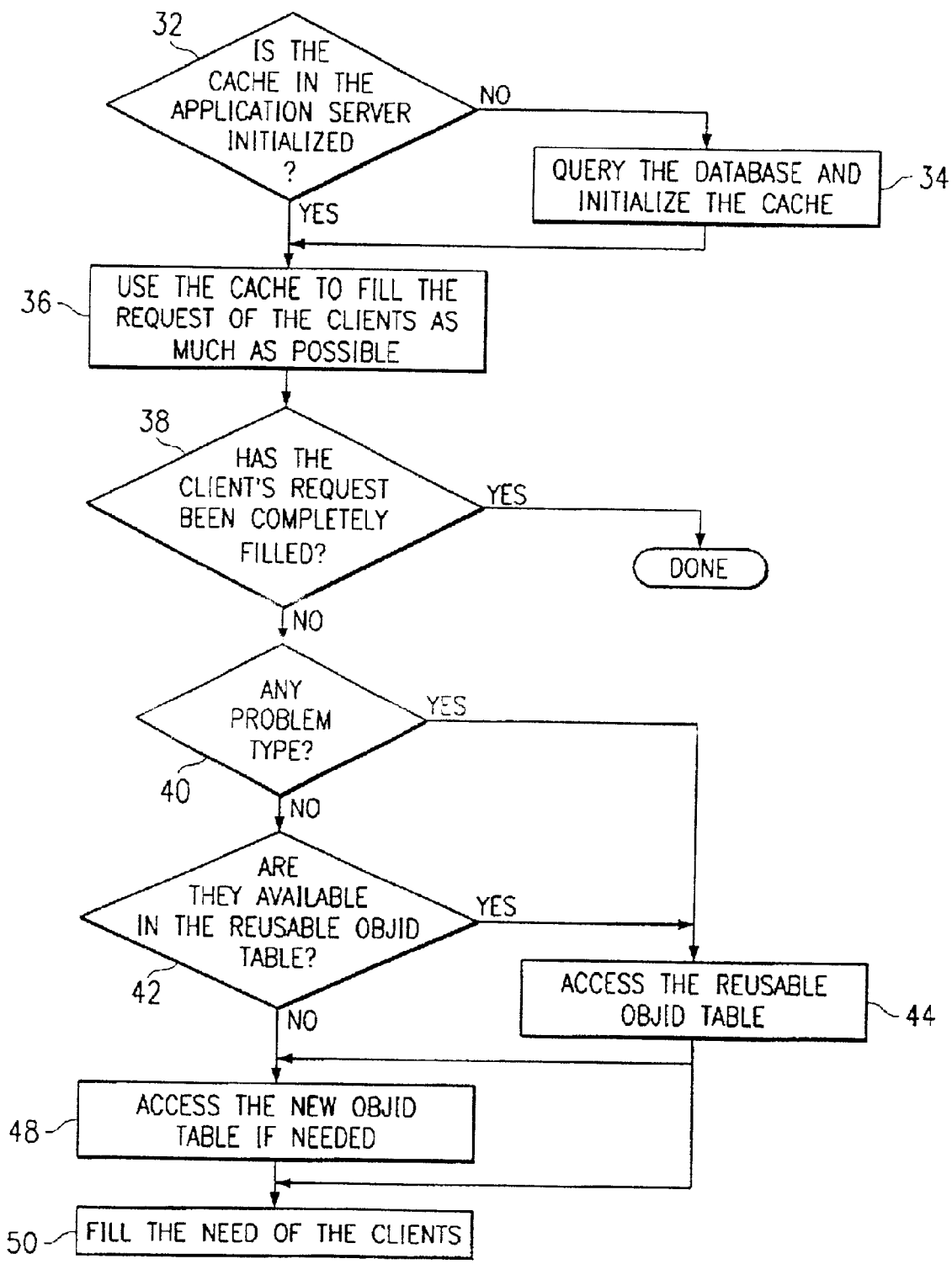
FIG. 3 illustrates a flow diagram for implementing the method for distributing and reusing object identifiers according to one example of the present invention.

Referring now to FIG. 3, a flow diagram 30 illustrates a detailed algorithm for caching and reusing an objid. For the sake of example, it is assumed the objids are stored in the cache memory of each application server 14 (FIG. 2). First, in step 32, the cache memory in the application server 14 is checked to see whether it is initialized for distributing objids. If the cache is not initialized, a query may be made to the database 12 so that the cache can be initialized (step 34). When the application server 14 queries the database 12, the Reusable Objid Table 27 is searched, and information about each available type of objids is provided. For example, referring back to the reusable Objid Table 27, after the query, the application server 14 could store information regarding which types of objids are available, which types of objids are not available, and which types of objids are designated as "problems" in the Reusable Objid Table 27. When the Reusable Objid Table 27 is populated as in the example as illustrated by Table 2, there are altogether four types of objids, and types 1 and 3 are available, while type 4 is a problem, and type 2 is unavailable. With this information, the cache is initialized.

If the cache has been initialized, when a client application sends a request 30 for a set of objids of different types, the application server 14 would fill as many of the objids as possible from its cache in step 36 before it requests for more from the database 12. A determination is made in step 38 to see whether the available objids in the cache have fully met the request from the client. For instance, if a request from the client asks for two objids of type 1, two objids of type 2, and five objids of type 4, assuming the application server has only one objid for each requested type, it will fill the request partially and further request one objid of type 1, one objid of type 2, and 4 objids of type 4 from the database.

When the application server 14 goes to the database 12 seeking more objids, there is a preference for using the Reusable Objid Table 27 to obtain the needed objids first before the New Objid Table 28 is accessed. In this way, existing and available objids are used, so that more objid numbers can be preserved for future use. In step 40, it is determined whether the needed objids are a problem type in the Reusable Objid Table 27 (e.g., there is an excessively abundant supply of the objids). If so, it is further determined in step 42 whether other types of objids needed are available in the Reusable Objid Table 27. Following the example immediately above, if one objid of type 1, one objid of type 2, and four objids of type 4 are needed, and it is then determined that type 4 is a problem type, and type 2 is not available in the Reusable Objid Table 27, type 4 objids are fetched from the Reusable Objid Table 27 while type 1 and type 2 objids are retrieved from the New Objid Table 28. If only one type 1 objid and 1 type 4 objids are needed, all the requested objids are fetched from the Reusable Objid Table 27. The general rule is that if there is a problem type, the objids of such a type, and any other types still available in the Reusable Objid Table 27 will be obtained from the Reusable Objid Table 27 instead of the New Objid Table 28 in step 44. If in step 42, there is a type such as type 2 in the example indicated as not available in the Reusable Objid Table 27, the application server 14 goes directly to the New Objid Table 28 for obtaining new numbers in step 48. If step 44 results in no block of objids being returned for a certain type, the application server deems the type "exhausted" in its memory and does not go back to the Reusable Objid Table 27 for as long as its operation lasts. If the Reusable Objid Table 27 only provides some of the needed objids of a particular type, it does not imply that the Reusable Objid Table has "exhausted" this type of objid. The application server 14 will go back to the Reusable table again for such a type.

If all the needed types are available in the Reusable Objid Table 27, it will be the sole source for providing the application server the needed objids. If the Reusable Objid Table 27 only provides a partial fill of the request, additional objids must be obtained from the New Objid Table 28 (step 48). It is noted that the Reusable Objid Table 27 is the source for providing any problem type objids regardless of the availability of the other types. Therefore, it is possible that the application server 14 will receive sufficient objids from both Tables (such as the example immediately above wherein type 4 objids are obtained from the Reusable Objid Table 27 and the rest from the New Objid Table 28). It is further noted that it would be preferred that only one table is accessed if possible to save time and resources, and thus, the Reusable Objid Table 27 is accessed first to see if the objids are available because one primary goal of the present invention is to reuse the objids as much as possible. In other words, the Reusable Objid Table 27 is the preferred source for the objids.

While obtaining the needed objids from the New Objid Table 28, an additional number of objids of each type may be obtained for each request growing at a certain rate or factor. For instance, if the predetermined rate is 50% and the current number for the additional objids requested from the New Objid Table 28 is 4, the next rounds of extra objids of the same type will be set at a number of 6, 9, 13, 19, etc. respectively, until a predetermined maximum is reached. In some examples of the present invention, the maximum is preferred to be 128 objids for application servers, and 16 objids for the second tier clients. After obtaining these additional objids, the application server 14 builds up a cache for the objids so that minimum requests will be made to the database for obtaining objids requested by its clients.

The above disclosure provides many different embodiments, or examples, for implementing different features of the invention. Also, specific examples of components and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for maintaining object identifiers in a distributed database system, the distributed database having at least one application server independently located from each other, the application servers requiring the object identifiers of a plurality of types for servicing client applications, the method comprising:

maintaining a first source of object identifiers created by the database system for supplying unallocated object identifiers;

maintaining a second source of object identifiers including reusable object identifiers;

storing a predetermined number of object identifiers in memory coupled to the application server for fulfilling a request by a client application, the request containing a requested number of object identifiers of a plurality of data types;

if the application server can not distribute the requested number of object identifiers, requesting additional object identifiers from the second source;

if the second source can not fulfill the request of the application server, requesting additional object identifiers from the first source, wherein an additional number of the object identifiers of each type are requested from the first and second source by the application server when the application server assigns the stored object identifiers, and wherein the additional number of the object identifiers increases by a predetermined factor each time a request is made, such that the object identifiers may be maintained in the distributive database system.

2. The method of claim 1 wherein the first source identifies the last created object identifier of each type.

3. The method of claim 1 wherein the second source contains discrete blocks of object identifiers of each type.

4. The method of claim 1 wherein the step of storing further includes querying the second source for availability of the object identifiers.

5. The method of claim 1 wherein the step of storing further includes obtaining available object identifiers from the second source and the first source if the number of object identifiers provided by the second source is not sufficient to fulfill the requested number of client identifiers.

6. The method of claim 1 wherein the step of storing further includes obtaining the object identifiers directly from the first source if at least one type of the needed object identifier is not available in the second source.

7. The method of claim 1 wherein the application server obtains the needed object identifiers from the second source if there is an excessive supply of the object identifiers of such type.

8. An apparatus for distributing and reusing object identifiers in a distributed database system, the object identifiers having a plurality of types, the system comprising:

a first table of unallocated object identifiers of each data type created by the database system;

a second table of reusable object identifiers distributable to at least one application server, wherein the second table is a preferred source from which to obtain the object identifiers over the first table; and a storage device in the application server for storing and distributing a predetermined set of object identifiers obtained from the first and second tables for servicing client applications related to the application server, wherein the storage device includes a means for requesting the object identifiers from the first table if they can not be obtained from the second table, and wherein the additional number of object identifiers increases by a predetermined rate each time the application server requests the object identifiers from the first table.

9. The system of claim 8 wherein the first table identifies the last created object identifier for each type of object identifier.

10. The system of claim 8 wherein the second table contains discrete blocks of object identifiers for each type of data.

11. The system of claim 8 wherein the storage device further includes a means for querying the second table for availability of the object identifiers requested by the client applications.

12. The system of claim 8 further comprising a means for returning unassigned object identifiers to the second table when the application server is terminated in a normal operation.

13. A method for efficiently providing object identifiers in a computer system, the method comprising:

determining if a needed object identifier is available from a first source of object identifiers, wherein the first source stores a plurality of reusable object identifiers;

accessing the first source for the needed object identifier if the needed object identifier is available from the first source; and accessing a second source for the needed object identifier if the needed object identifier is not available from the first source, wherein the second source stores a plurality of new object identifiers.

* * * * *

UNITED STATES PATENT AND TRADEMARK OFFICE
CERTIFICATE OF CORRECTION

PATENT NO. : 6,662,191 B1
DATED : December 9, 2003
INVENTOR(S) : Cherniavsky et al.

It is certified that error appears in the above-identified patent and that said Letters Patent is hereby corrected as shown below:

Column 2,
Line 45, the words "supply objid" should read -- supply objids --.
Line 47, the word "network" should read -- networks --.
Line 48, the word "system" should read -- systems --.

Signed and Sealed this

Twenty-second Day of June, 2004

JON W. DUDAS
*Acting Director of the United States Patent and Trademark Office*